United States Patent [19]

Hardin, Jr. et al.

[11] Patent Number: 4,690,795
[45] Date of Patent: Sep. 1, 1987

[54] EMERGENCY TRANSFER TUBE CLOSURE AND PROCESS FOR SEALING TRANSFER TUBE UNDER EMERGENCY CONDITIONS

[75] Inventors: Roy T. Hardin, Jr., Unity Township, Westmoreland County; James R. Marshall, Penn Hills Township, Allegheny County, both of Pa.

[73] Assignee: Westinghouse Electric Corp., Pittsburgh, Pa.

[21] Appl. No.: 785,293

[22] Filed: Oct. 7, 1985

[51] Int. Cl.⁴ .............................................. G21C 19/19
[52] U.S. Cl. ..................................... 376/264; 376/203; 49/235
[58] Field of Search ............... 376/203, 204, 261, 264, 376/269; 138/89; 220/345, 346; 49/234, 235

[56] References Cited

U.S. PATENT DOCUMENTS

| | | | |
|---|---|---|---|
| 2,486,339 | 10/1949 | Stone | 49/235 |
| 3,020,225 | 2/1962 | Wootton | 376/269 |
| 3,066,089 | 11/1962 | Davies | 376/269 |
| 3,386,206 | 6/1968 | Loveless | 220/345 |
| 4,028,896 | 6/1977 | Whipps . | |
| 4,078,969 | 3/1978 | Garin . | |
| 4,096,664 | 6/1978 | Perry | 49/235 |
| 4,355,000 | 10/1982 | Lumelleau . | |
| 4,375,104 | 2/1983 | Starr et al. . | |
| 4,436,692 | 3/1984 | Stenabaugh . | |
| 4,470,946 | 9/1984 | Vassalotte et al. . | |
| 4,474,205 | 10/1984 | Dreyer et al. . | |
| 4,519,519 | 5/1985 | Meuschke et al. | 138/89 |

Primary Examiner—Deborah L. Kyle
Assistant Examiner—Richard L. Klein
Attorney, Agent, or Firm—Daniel C. Abeles

[57] ABSTRACT

An emergency transfer tube closure for a nuclear reactor well comprising an elongated, vertically-extending, U-shaped guide laterally disposed on each side of the transfer tube, a closure plate vertically disposed between the guides having rollers thereon riding within the guides permitting movement of the closure plate downwardly into sealing engagement with the transfer tube under emergency conditions.

12 Claims, 7 Drawing Figures

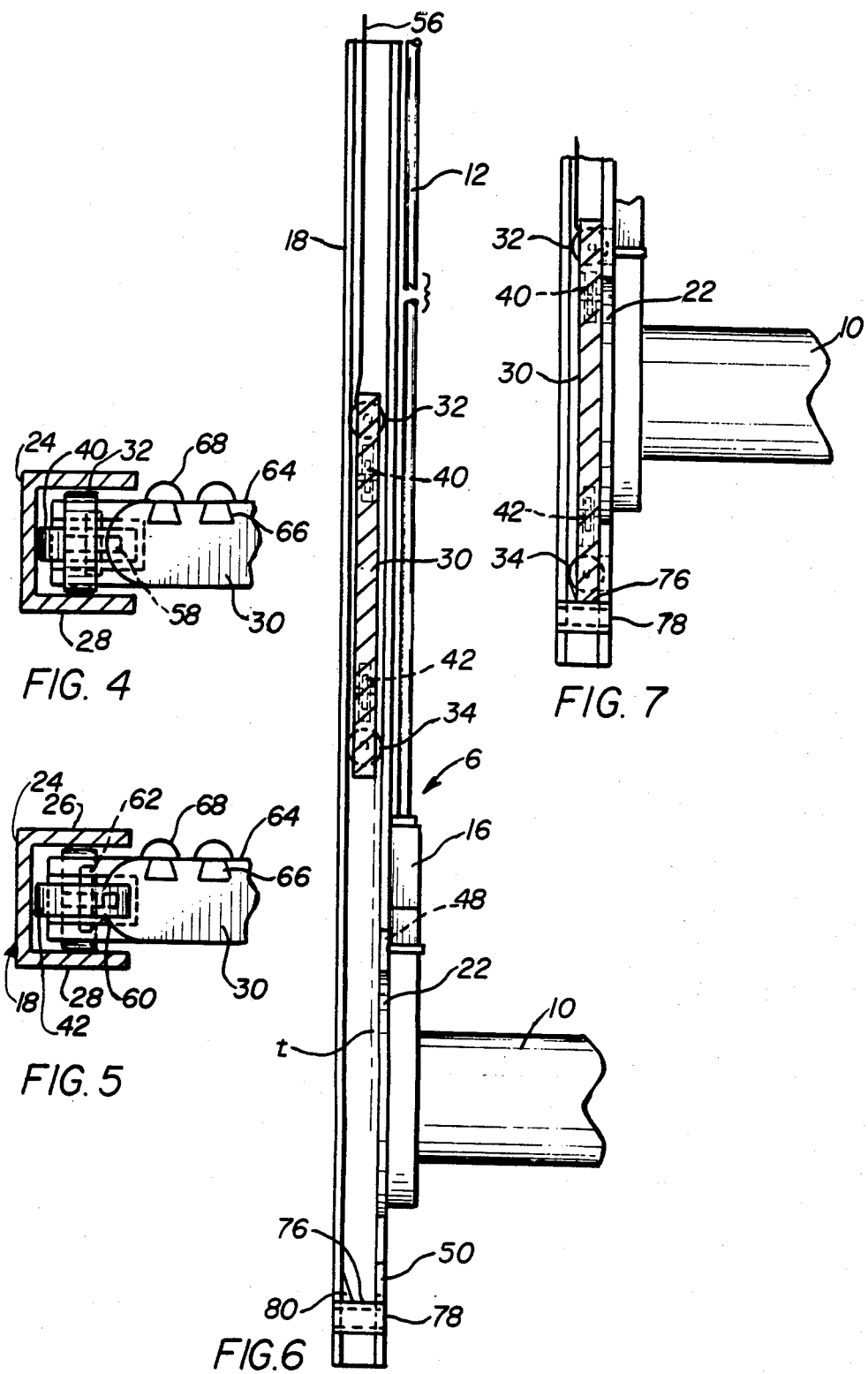

EMERGENCY TRANSFER TUBE CLOSURE AND PROCESS FOR SEALING TRANSFER TUBE UNDER EMERGENCY CONDITIONS

FIELD OF THE INVENTION

This invention relates to an emergency transfer tube closure for a nuclear reactor that comprises a pair of elongated, vertically-extending U-shaped guides, one disposed laterally on each side of a transfer tube, a closure plate vertically disposed between said guides, rollers rotatably mounted on each side of said plate adjacent said guides adapted to ride within said guides and to facilitate movement of said plate downwardly into sealing engagement with said transfer tube under emergency conditions. The process for sealing said transfer tube under emergency conditions is also claimed.

BACKGROUND OF THE INVENTION

In nuclear reactor generating plants there is a large reactor well structure and a spent fuel storage pool structure adjacent thereto. The latter is typically filled with a fluid, such as water, to isolate the spent fuel from the surrounding environment and to serve as a protective outer structure for the spent nuclear fuel. The reactor well contains a fuel transfer tube through which fresh fuel is brought into the reactor well during refueling operations. Normally, the fuel transfer tube is maintained in its closed position by means of a plate valve therein that extends across the opening therein. During refueling operations, the plate valve is lifted up out of position, by any suitable means, to permit entry therein. In the event the reactor cavity seal fails during the refueling operation, and water from the spent fuel storage pool structure begins to flow through the fuel transfer tube into the reactor well, it is absolutely necessary to stop the flow of water into the reactor well as quickly as possible. The normal plate valve is hand operated and cannot be closed quickly in such emergency. The novel fuel transfer device claimed herein will quickly and effectively stop the flow of water from the spent fuel storage pool into the reactor well in such emergency conditions. Afterwards, the normal plate valve can be moved into closed position and the emergency transfer tube closure claimed herein can be removed into its storage position.

Means for maintaining sealing means between adjacent structures in nuclear reactor plants are known. Garin in U.S. Pat. No. 4,078,969, discloses a flexible metal seal attached to a component of a nuclear reactor closure head capable of being drawn substantially tightly against another such component by an activating mechanism located on one of the components for sealing the annulus between the components under severe reactor conditions while allowing rotation of these components under normal reactor conditions. In U.S. Pat. No. 4,355,000 Lumelleau discloses sealing means operable to provide a fluid-tight seal between a gate and the wall of a reactor well which comprises a beam structure having a generally U-shaped I-beam, a gate with support elements engageable with the transverse members of the beam structure to support the beam on the gate, and a plurality of inflatable sealing elements arranged along the entire length of the U-shaped beam, which are inflated after the gate is closed to form the desired leak-tight seal. Starr et al., in U.S. Pat. No. 4,375,104, disclose a device for sealing a gateway between interconnectable pools in a nuclear facility comprising a liquid impermeable, pliant sheet sealed to the frame of the sealing device and an inflatable sealing tube mounted in a channel about the periphery of the frame. Stenabaugh in U.S. Pat. No. 4,436,692, discloses apparatus for plugging a nozzle in a boiling water reactor comprising a disc-shaped plug movable into position by means of cables. In U.S. Pat. No. 4,470,946, Vassalotte et al. disclose a plugging device for pressure testing a steam pipeline in a boiling water reactor comprising an inflatable annular member and radially movable shoes for holding the plug in place. Vertically movable gate assembly closures are also known. Shipps in U.S. Pat. No. 4,028,896, discloses a sluice gate assembly comprising a frame, gate disc guides mounted on the frame, and a gate disc slidably supported by the gate disc guides for vertical movement of the gate. Dreyer et al., in U.S. Pat. No. 4,474,205, disclose a conduit closure apparatus comprising a first frame and a second frame slidably fitting vertically within the channels of the first frame.

SUMMARY OF THE INVENTION

The novel apparatus herein is adapted to close, under emergency conditions, the opening of a transfer tube projecting outwardly from a wall of a nuclear fuel reactor well. Included in the apparatus are a pair of elongated, vertically-extending, U-shaped guides, one disposed laterally on each side of the transfer tube, each of the U-shaped guides comprising a base and laterally-extending flanges thereon. Each of the U-shaped guides has its open end facing the open end of the other U-shaped guide. A rectangular closure plate, having a surface greater in area than the area circumscribed by the outer circumference of a circumferential flange extending laterally from the fuel transfer tube, is vertically disposed between the U-shaped guides. The closure plate is normally disposed above the transfer tube in a vertical plane just slightly in front of the vertical plane of the circumferential flange of the fuel transfer tube. Two pairs of rollers are provided, one pair of which is rotatably mounted on each side of the closure plate adjacent the U-shaped guides and ride on the inner portions of each of the flanges of each of the U-shaped guides. Preferably, two additional pairs of rollers are also provided, one pair of which is rotatably mounted on each side of the plate adjacent the U-shaped guides and ride on the inner portion of the base of each of the U-shaped guides. Each of the U-shaped guides is provided with a pair of spatially-disposed openings on one of its flanges adjacent the wall of the nuclear fuel reactor. Each of these pairs of openings is disposed on the U-shaped guide a distance equal to the distance between the center lines of the corresponding first-named pairs of rollers riding within the guides. Each of these openings is thus spatially disposed to correspond to the spatial disposition of the first-named pairs of rollers and is sufficiently large to receive a corresponding roller of the first-named pairs of rollers in the U-shaped guide. The face of the closure plate is preferably provided on the face thereof with sealing means spatially corresponding to the outer face of the circumferential flange of the fuel transfer tube. The openings in the flanges of the U-shaped guides are spatially displaced thereon so that when the first-named pairs of rollers are disposed therein, the face of the plate adjacent the circumferential flange of the fuel transfer tube will be in sealing engagement with the outer face of the circumferential flange. Means are provided to normally maintain the closure plate vertically free of sealing engagement with the circumferential flange.

BRIEF DESCRIPTION OF THE DRAWINGS

FIG. 4 is a section taken along the line 4—4 of FIG. 2 illustrating mounting means of the first pair of rollers on the closure plate;

FIG. 5 is a section taken along the line 5—5 of FIG. 2 illustrating mounting means of the second pair of rollers on the closure plate;

FIG. 6 is a section taken along the line 6—6 of FIG. 2 showing that the closure plate is normally disposed in a vertical plane just slightly in front of the plane of the circumferential flange of the closure tube; and FIG. 7 is a section taken along the lines 7—7 of FIG. 3 showing the closure plate in sealing engagement with the circumferential flange of the closure tube.

DESCRIPTION OF THE PREFERRED EMBODIMENT

Figure 1:
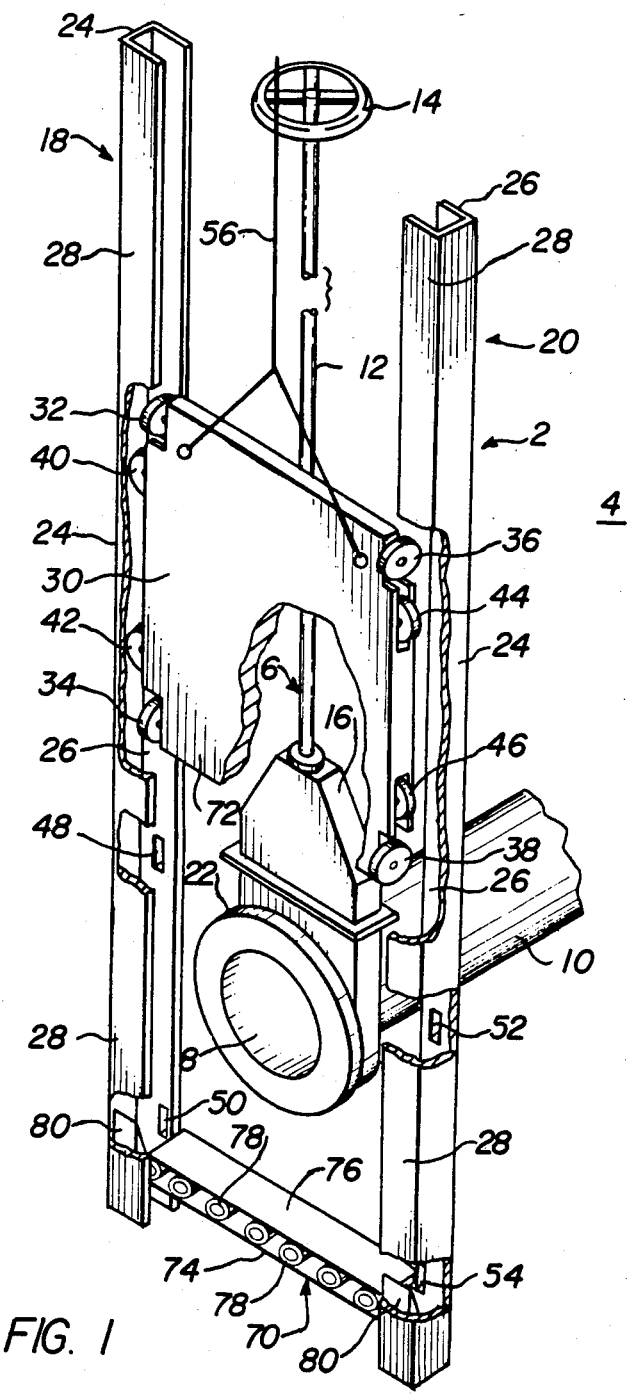
FIG. 1 is a perspective view, partially cut away, showing a portion of a nuclear reactor facility embodying the novel emergency transfer tube closure herein.

Referring to FIG. 1, there is shown the emergency fuel transfer tube closure 2, securely mounted by means not shown, on a wall 4 of a nuclear reactor well, or similar facility. Also shown in FIG. 1, is a transfer tube closure 6 that is also in place, also securely mounted by means not shown, to the wall 4 of the nuclear reactor well, provided with means to move a closure plate 8 downwardly into fuel transfer tube 10 to close the same or to move the closure plate 8 upwardly out of transfer tube 10 to open the same. The means employed to operate such closure 6 are not critical and can include, for example, an elongated shaft 12, means, such as a wheel 14, attached thereto for rotating shaft 12, and any well-known, suitable means not shown, within housing 16, that will translate rotation of shaft 12 into the desired vertical movement of closure plate 8. The transfer tube closure 6 is normally used to open and close fuel transfer tube 10 and the novel emergency transfer tube closure claimed herein is used only under emergency conditions when closure of fuel transfer tube 10 is desired much more quickly than would be obtainable, or possible, using normal transfer tube closure 6.

Figure 2:
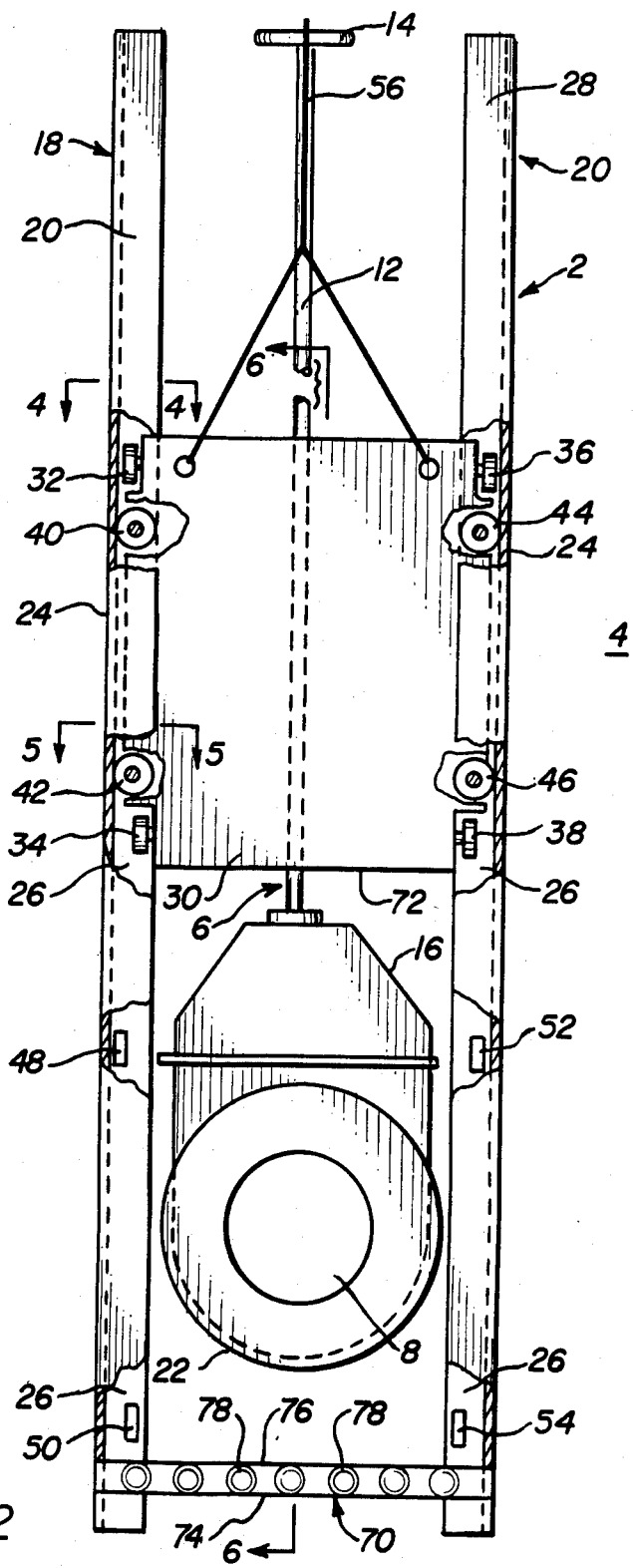
FIG. 2 is an elevational view, partially cut away, of the novel emergency fuel transfer tube closure claimed herein prior to emergency use.
Figure 3:
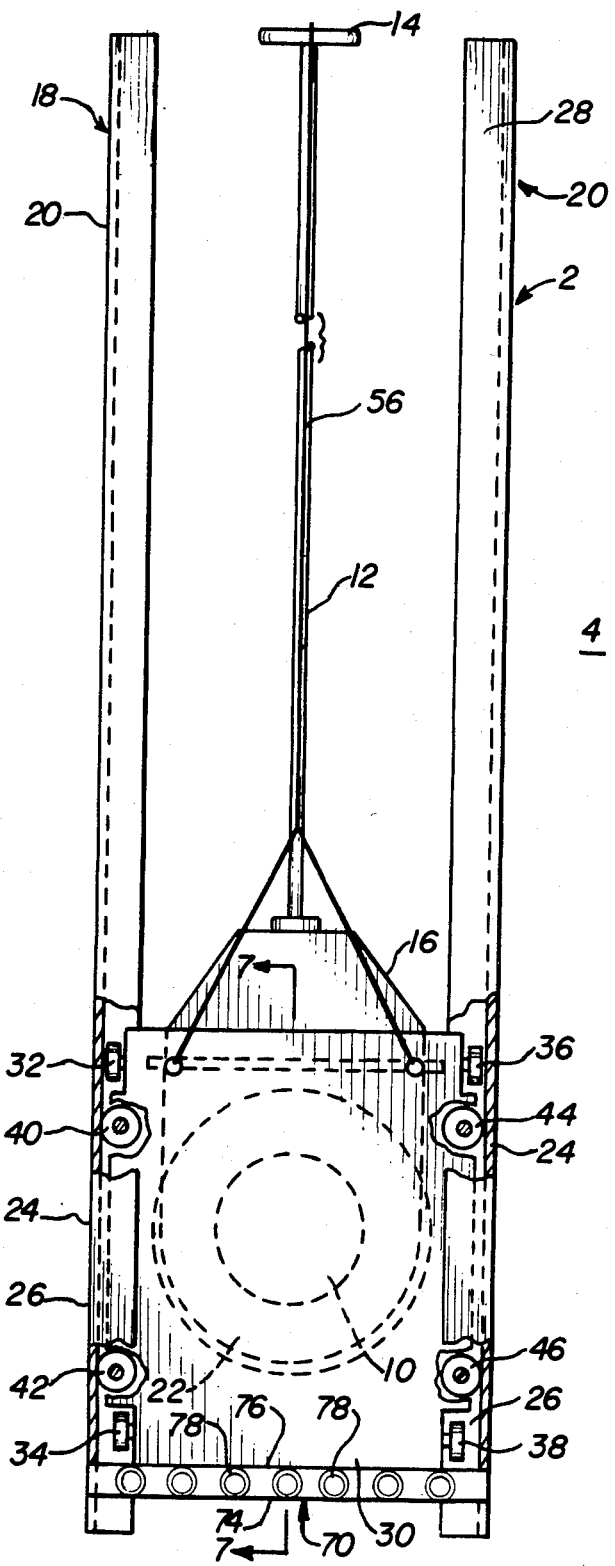
FIG. 3 is an elevational view of the novel emergency fuel transfer tube closure in its emergency, operative state sealing the transfer tube.

As shown in FIGS. 1 and 2, the emergency fuel transfer tube closure 2 includes a pair of elongated, vertically-extending, U-shaped guides 18 and 20 securely mounted, by means not shown, on the wall 4 of the nuclear reactor well. One U-shaped guide is disposed laterally on each side of the fuel transfer tube 10 having a circumferential flange 22 extending outwardly laterally therefrom at the outer edge thereof. Each of U-shaped guides 18 and 20 comprises a base 24 and laterally-extending flanges 26 and 28. The U-shaped guides 18 and 20 have their open ends facing each other.

A rectangular closure plate 30, having a surface on the side facing said circumferential flange 22 greater in area than the area circumscribed by the outer circumference of circumferential flange 22 on said fuel transfer tube 10, is vertically disposed between said U-shaped guides 18 and 20. As shown in FIG. 6, closure plate 30 is mounted, before emergency use, vertically above said fuel transfer tube 10 so that its inner face is in a vertical plane just slightly in front of the plane of the outer face of circumferential flange 22. The distance between the two planes is defined by the distance "t" in FIG. 6.

Two pairs of rollers 32 and 34, and 36 and 38, are provided, one pair of which is rotatably mounted on each side of the closure plate 30 adjacent U-shaped guides 18 and 20, respectively, that ride on the inner portions of each of flanges 26 and 28 of the respective U-shaped guides 18 and 20. In a preferred embodiment, in order to prevent binding of closure plate 30 within U-shaped guides 18 and 20 and to facilitate downward movement of closure plate 30 within U-shaped guides 18 and 20, two additional pairs of rollers 40 and 42, and 44 and 46, are also provided, one pair of which is also rotatably mounted on each side of closure plate 30, adjacent U-shaped guides 18 and 20, respectively, that extend laterally outwardly therefrom and ride on the inner portions of the base 24 of the respective U-shaped guides 18 and 20.

Each of U-shaped guides 18 and 20 is provided with a pair of spatially disposed, vertically elongated openings 48 and 50, and 52 and 54, respectively, on each flange 26. Openings 48, 50, 52, 54, spatially surround fuel transfer tube 10 and each has a length greater than the diameter of rollers 32, 34, 36 and 38, respectively. The distance between the center lines of openings 48 and 50 is equal to the distance between the center lines of rollers 32 and 34, and similarly, the distance between the center lines of openings 52 and 54 is equal to the distance between the center lines of rollers 36 and 38, so that when closure plate 30 moves downwardly into sealing engagement with circumferential flange 22 on fuel transfer tube 10, rollers 32 and 34 will move into openings 48 and 50, respectively, and rollers 36 and 38 will move into openings 52 and 54, respectively. Thus, each of said openings is spatially disposed to correspond to the spatial disposition of each of said first pairs of rollers. The openings are made large enough to enable the closure plate 30 to move toward circumferential flange 22 in its operative, emergency mode the distance "t", defined above. Thus, closure plate 30 can move downwardly, in operation, safely past circumferential flange 22, but just as it is facing circumferential flange 22 and the rollers move into their respective openings in flanges 26, the closure plate 30 will move toward circumferential flange 22 the distance "t", bringing it into sealing engagement with circumferential flange 22, as shown in FIG. 7. As shown in FIG. 2, upper rollers 32 and 36 preferably are not in vertical alignment with lower rollers 34 and 38, respectively. Similarly, upper openings 48 and 52 are not in vertical alignment with lower openings 50 and 54, respectively. This is done so that rollers 34 and 38 will not engage slots 48 and 52 as the closure plate 30 moves downward, approaching the closed position. When rollers 32, 34, 36 and 38 are engaged within openings 48, 50, 52 and 54, respectively, the closure plate will be maintained in its closed or sealed position. Closure plate 30 is normally maintained its ready state, prior to emergency operation, as shown in FIG. 1, in a vertical position vertically above fuel transfer line 10 in any suitable manner, for example, by cable 56 secured to closure plate 30 at one end, as shown, and secured to fixed means at the other end, not shown.

The rollers on closure plate 30 can be mounted thereon in any suitable manner. As shown in FIG. 4, roller 32, and similarly rollers 34, 36 and 38, can be rotatably mounted on a shaft 58, firmly positioned in closure plate 30, so that it extends laterally outwardly from the vertical edge of closure plate 30. In FIG. 5, a preferred mounting for roller 42, and similarly rollers 40, 44 and 46, is shown. Thus, a vertical edge of closure plate 30 is provided with a recess 60 in which a shaft 62 is firmly positioned and upon which roller 42 is rotatably mounted. The roller 42 extends outwardly from the vertical edge of closure plate 30 so that it rides on the inner surface of the base 24 of the U-shaped guide.

To provide a more effective seal between closure plate 30 and circumferential flange 22, in use, the inner surface 64 of closure plate 30 can be provided with at least one circumferential dovetail slot 66, as shown in FIGS. 4 and 5, containing a resilient material 68 such as rubber. The dovetail slot 66 is positioned on closure plate 30 so that it faces the outer surface or face of circumferential flange 22 when the closure plate 30 and the circumferential flange 22 are in sealing engagement. If desired, corresponding dovetail slots carrying a resilient material, could be mounted on the outer surface of circumferential flange 22, instead of closure plate 30.

In order to bring the closure plate 30 to a controlled stop in use, a shock absorber 70 (FIG. 1) is securely mounted, by means not shown, between U-shaped guides 18 and 20 below openings 50 and 54, extending across the path of closure plate 30, to be in abutting relation with the lower edge 72 of closure plate 30 when each of rollers 32, 34, 36 and 38 is in engagement with openings 48, 50, 52 and 54, respectively. Shock absorber 70 can be made of two horizontal metal plates 74 and 76 between which metallic tubular members 78 are laterally disposed. If desired, wedges 80 (FIGS. 6 and 7) tapering inwardly and upwardly toward flange 28 can be securely mounted, by means not shown, on the underside of each outer flange 28 of each of U-shaped guides 18 and 20, just above shock absorber 70, to firmly force closure plate 30 against circumferential flange 22. Fluid pressure on the exposed sealing area will force the closure plate against the transfer tube flange, thus compressing the seals which contact the face of the transfer tube flange when the four rollers are aligned with their respective slots or openings.

The operation of the novel emergency fuel transfer tube closure device is as follows. As pointed out hereinabove, the arrangement in FIG. 2 is the arrangement wherein the closure plate 30 is positioned vertically above the fuel transfer tube 10 ready for use in an emergency situation. When an emergency occurs, that is, when transfer tube closure 6 is open and fuel transfer tube 10 must be closed quickly, cable 56 is quickly released from its secured position, by means not shown, and closure plate 30 then moves downwardly within the path defined by U-shaped guides 18 and 20 until rollers 32, 34, 36 and 38 come into engagement with openings 48, 50, 52 and 54. As shown in FIG. 7, when this occurs, the inner surface 64 of closure plate 30 moves inwardly toward the outer surface of circumferential flange 22 of fuel transfer tube 10 by an amount defined by the distance "t", defined hereinabove, creating an effective seal therebetween. Thus, no movement of liquid through fuel transfer tube 10 is possible. When the emergency is over, closure plate 30 can be lifted vertically by cable 56 out of engagement with circumferential flange 22 and maintained in such position for further possible emergency use.

What is claimed is:

1. In a nuclear-fuel reactor well that includes a transfer tube projecting outwardly from wall thereof, said transfer tube having a first closure assembly, and said transfer tube having a circumferential flange extending outwardly laterally therefrom, an emergency transfer tube closure therefor comprising; a pair of elongated, vertically-extending U-shaped guides, one U-shaped guide disposed laterally on each side of said transfer tube, each of said U-shaped guides comprising a base and laterally-extending flanges thereon, said U-shaped guides having their open ends facing each other, a closure plate, having a surface facing said circumferential flange greater in area than the area circumscribed by the outer circumference of said circumferential flange, vertically disposed between said U-shaped guides, said closure plate normally being disposed in a vertical plane just slightly in front of the vertical plane of said circumferential flange, two pairs of rollers, one pair of which is rotatably mounted on each side of said closure plate adjacent said U-shaped guides, riding on the inner portion of each of said flanges of each of said U-shaped guides, each of said U-shaped guides being provided with a pair of spatially disposed openings on a flange thereof adjacent said wall of said nuclear fuel reactor well, each of said pairs of openings being disposed on each of said U-shaped guides a distance equal to the distance between the center lines of the corresponding pair of rollers riding within said U-shaped guides, each of said openings being sufficiently large to receive a corresponding roller of said pairs of rollers in said U-shaped guides, said openings being shaped on said flanges of said U-shaped guides so that when said pairs of rollers are disposed therein, the face of said closure plate will be in sealing engagement with said circumferential flange of said transfer tube.

2. The emergency transfer tube closure of claim 1 wherein said closure plate is provided with two additional pairs of rollers, one pair of which is rotatably mounted on each side thereof adjacent said U-shaped guides that ride on the inner portion of said base of each of said U-shaped guides.

3. The emergency transfer tube closure of claim 2 wherein said closure plate is provided on said face thereof facing said circumferential flange with circumferential slots in which a resilient material is mounted, said circumferential slots being positioned on said closure plate so that they face the outer surface of said circumferential flange when said closure plate is in sealing engagement with said circumferential flange.

4. The emergency transfer tube closure of claim 1 wherein one roller in each pair of rollers is not in vertical alignment with the other roller in said pair of rollers.

5. The emergency transfer tube closure of claim 1 wherein a shock absorber is mounted between said U-shaped guides extending across the path of said closure plate and in abutting relationship with the lower end of said closure plate when said rollers are positioned in said openings.

6. The emergency transfer tube closure of claim 1 wherein the inner surface of said laterally extending flange of each of said U-shaped guides remote from said wall of said nuclear fuel reactor is provided with a wedge adjacent the base thereof for moving said closure plate toward said circumferential flange when said rollers are positioned in said openings.

7. In a nuclear reactor well that includes a transfer tube projecting outwardly from a wall thereof, said transfer tube having a first closure assembly, and said transfer tube having a circumferential flange extending outwardly laterally therefrom, an emergency transfer tube closure therefor comprising; a pair of elongated, vertically-extending, U-shaped guides, one disposed laterally on each side of said transfer tube, each of said U-shaped guides comprising a base and laterally-extending flanges thereon, said U-shaped guides having their open ends facing each other, a closure plate, having a surface on the side facing said circumferential flange greater in area than the area circumscribed by the outer circumference of said circumferential flange, vertically disposed between said U-shaped guides, said closure plate being provided on said face thereof facing said circumferential flange with circumferential slots in which a resilient material is mounted, said circumferential slots being positioned on said closure plate so that they face the outer surface of said circumferential flange when said plate is in sealing engagement with said circumferential flange, said closure plate normally being disposed in a vertical plane just slightly in front of the vertical plane of said circumferential flange, two pairs of rollers, one pair of which is rotatably mounted on each side of said closure plate adjacent said U-shaped guides, riding on the inner portion of each of said flanges of each of said U-shaped guides, two additional pairs of rollers, one pair of which is rotatably mounted on each side of said closure plate adjacent said U-shaped guides, riding on the inner portions of said base of each of said U-shaped guides, one roller in each of said first-named pair of rollers not being in vertical alignment with the other roller in each of said first-named pair of rollers, each of said U-shaped guides being provided with a pair of spatially disposed openings on a flange thereof adjacent said wall of said nuclear fuel reactor well, each of said pairs of openings being disposed on each of said U-shaped guides a distance equal to the distance between the center lines of the corresponding pair of rollers riding within said U-shaped guides, each of said openings being sufficiently large to receive a corresponding roller of said first-named pairs of rollers in said U-shaped guides, said openings being spaced on said flanges of said U-shaped guides so that when said first-named pair of rollers are disposed therein, the face of said closure plate will be in sealing engagement with said circumferential flange of said transfer tube, and a shock absorber mounted between said U-shaped guides extending across the path of said closure plate and in abutting relationship with the lower end of said closure plate when said rollers are positioned in said openings.

8. A process for quickly closing a transfer tube in an emergency condition, said transfer tube having a circumferential flange extending outwardly and laterally therefrom, said transfer tube having a first closure assembly, and said transfer tube projecting outwardly from the wall of a nuclear fuel reactor well which comprises suspending a closure plate, having a surface on the side facing said circumferential flange greater in area than the area circumscribed by the outer circumference of said circumferential flange, vertically above said transfer tube in a plane just slightly in front of the vertical plane of said circumferential flange, said closure plate being disposed between two elongated, vertically-extending U-shaped guides, one U-shaped guide disposed laterally on each side of said transfer tube, each of said U-shaped guides comprising a base and laterally-extending flanges thereon, each of said U-shaped guides having their open ends facing each other, two pairs of rollers, one pair of which is mounted on each side of said closure plate adjacent said U-shaped guides, riding on the inner portion of each of said flanges, each of said U-shaped guides being provided with a pair of spatially disposed openings on a flange thereof adjacent said wall of said nuclear fuel reactor well, each of said pairs of openings being disposed on each of said U-shaped guides a distance equal to the distance between the center lines of the corresponding pair of rollers riding within said U-shaped guides, each of said openings being spatially disposed to correspond to the spatial disposition of said rollers and being sufficiently large to receive a corresponding roller of said pairs of rollers; and, in an emergency condition, releasing said closure plate so that said closure plate moves downwardly between said U-shaped guides, said rollers are received within said openings and said closure plate is forced into sealing engagement with said circumferential flange.

9. The process of claim 8 wherein said closure plate is provided with two additional pairs of rollers, one pair of which is mounted on each side thereof adjacent said U-shaped guides that ride on the inner portion of said base of each of said U-shaped guides.

10. The process of claim 9 wherein said closure plate is provided on the face thereof facing said circumferential flange with circumferential slots in which a resilient material is mounted, said circumferential slots being positioned on said closure plate so that they face the outer surface of said circumferential flange when said closure plate is in sealing engagement with said circumferential flange.

11. The process of claim 8 wherein further downward movement of said closure plate is prevented by mounting shock absorbing means between said U-shaped guides extending across the path of said closure plate and in abutting relationship with the lower end of said closure plate when said rollers are in said openings.

12. A process for quickly closing a transfer tube in an emergency condition, said transfer tube having a circumferential flange extending outwardly and laterally therefrom, said transfer tube having a first closure assembly, and said transfer tube projecting outwardly from the wall of a nuclear fuel reactor well, which comprises suspending a closure plate having a surface on the side facing said circumferential flange greater in area than the area circumscribed by the outer circumference of said circumferential flange, vertically above said transfer tube in a plane just slightly in front of the vertical plane of said circumferential flange, said closure plate being provided on the face thereof facing said circumferential flange with circumferential slots in which a resilient material is mounted, said circumferential slots being positioned on said closure plate so that they face the outer surface of said circumferential flange when said closure plate is in sealing engagement with said circumferential flange, said closure plate being disposed between two elongated, vertically-extending U-shaped guides, one U-shaped guide disposed laterally on each side of said transfer tube, each of said U-shaped guides comprising a base and laterally-extending flanges thereon, each of said U-shaped guides having their open ends facing each other, two pairs of rollers, one pair of which is rotatably mounted on each side of said closure plate adjacent said U-shaped guides, riding on the inner portion of each of said flanges of each of said U-shaped guides, two additional pairs of rollers, one pair of which is mounted on each side of said closure plate adjacent said U-shaped guides that ride on the inner portion of the base of said U-shaped guides, each of said U-shaped guides being provided with a pair of spatially disposed openings on a flange thereof adjacent said wall of said nuclear fuel reactor well, each of said pairs of openings being disposed on each of said U-shaped guides a distance equal to the distance between the center lines of the corresponding first-named pairs of rollers riding within said U-shaped guides, each of said openings being spatially disposed to correspond to the spatial dispositon of said first-named pairs of rollers and being sufficiently large to receive a corresponding roller of said first-named pairs of rollers; and, in an emergency condition releasing said closure plate so that said closure plate moves downwardly between said U-shaped guides, said first-named pairs of rollers are received within said openings and said closure plate is forced into sealing engagement with said circumferential flange; and preventing further downward movement of said closure plate by mounting shock absorbing means between said U-shaped guides extending across the path of said closure plate and in abutting relationship with the lower end of said closure plate when each of said first pair of rollers are in said openings.

* * * * *